United States Patent
Hauske

(10) Patent No.: US 9,203,508 B2
(45) Date of Patent: Dec. 1, 2015

(54) METHOD FOR ESTIMATING A CHROMATIC DISPERSION OF A RECEIVED OPTICAL SIGNAL

(71) Applicant: Huawei Technologies Co., Ltd., Shenzhen, Guangdong (CN)

(72) Inventor: Fabian Nikolaus Hauske, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 264 days.

(21) Appl. No.: 13/896,544

(22) Filed: May 17, 2013

(65) Prior Publication Data
US 2013/0243422 A1    Sep. 19, 2013

Related U.S. Application Data

(63) Continuation of application No. PCT/EP2012/051642, filed on Feb. 1, 2012.

(51) Int. Cl.
 H04B 10/08    (2006.01)
 H04B 17/00    (2015.01)
 (Continued)

(52) U.S. Cl.
 CPC .............. *H04B 10/07* (2013.01); *G01M 11/338* (2013.01)

(58) Field of Classification Search
 CPC .................... H04B 10/2507; H04B 10/25073; H04B 10/2513
 USPC .................................. 398/147, 158, 159, 136
 See application file for complete search history.

(56) References Cited

U.S. PATENT DOCUMENTS 6,462,863 B1 * 10/2002 Atieh et al. ................ 359/337.5
6,775,631 B2 * 8/2004 Van Schyndel ................ 702/85
(Continued)

FOREIGN PATENT DOCUMENTS

CN    1728564 A    2/2006
CN    101120566 A    2/2008
(Continued)

OTHER PUBLICATIONS

Jawad Munir, Amine Mezghani, Israa Slim, Josef Nossek, "Chromatic Dispersion Compensation using Complex-valued All-pass Filter", Sep. 2014, IEEE, pp. 396-400.*
(Continued)

*Primary Examiner* — David Payne
*Assistant Examiner* — Pranesh Barua

(57) ABSTRACT

The present disclosure relates to a method for estimating chromatic dispersion of a received optical signal ($R_x(f)$), the method comprising: scanning the received optical signal ($R_x(f)$) through a number (M) of chromatic dispersion compensation filters in a chromatic dispersion filter range ($D_{min} \ldots D_{max}$) between a first chromatic dispersion value ($D_{min}$) and a second chromatic dispersion value ($D_{max}$) with a resolution ($\Delta D$) determined by the chromatic dispersion filter range ($D_{min} \ldots D_{max}$) normalized by the number (M) of chromatic dispersion compensation filters to obtain filtered samples ($R_{x,D}(f)$) of the received optical signal ($R_x(f)$); and determining a correlation function ($C_D(\tau,B)$) indicating an estimate of the chromatic dispersion by correlating the filtered samples ($R_{x,D}(f)$) of the received optical signal ($R_x(f)$) with respect to frequency shifts ($\tau$) over a correlation bandwidth (B), wherein the correlation bandwidth (B), the chromatic dispersion filter range ($D_{min} \ldots D_{max}$) and the resolution ($\Delta D$) are iteratively adapted according to an optimization criterion.

15 Claims, 11 Drawing Sheets

(51) Int. Cl.
*H04B 10/12* (2006.01)
*H04B 10/00* (2013.01)
*H04B 10/07* (2013.01)
*G01M 11/00* (2006.01)

(56) References Cited

U.S. PATENT DOCUMENTS

| | | | |
|---|---|---|---|
| 8,792,789 B1* | 7/2014 | Varadarajan et al. | 398/159 |
| 2003/0112496 A1* | 6/2003 | Van Schyndel | 359/337.5 |
| 2006/0023817 A1 | 2/2006 | Buchali et al. | |
| 2006/0171283 A1 | 8/2006 | Vijayan et al. | |
| 2006/0269016 A1 | 11/2006 | Long et al. | |
| 2007/0177876 A1* | 8/2007 | Ooi et al. | 398/147 |
| 2008/0107426 A1* | 5/2008 | Bigot-Astruc et al. | 398/159 |
| 2010/0232802 A1* | 9/2010 | Boffi et al. | 398/149 |
| 2011/0255879 A1* | 10/2011 | Xie et al. | 398/208 |
| 2012/0096061 A1* | 4/2012 | Hauske | 708/319 |
| 2012/0106982 A1* | 5/2012 | Wagner et al. | 398/208 |
| 2012/0185523 A1* | 7/2012 | Hauske | 708/300 |
| 2013/0045004 A1* | 2/2013 | Geyer | 398/25 |

FOREIGN PATENT DOCUMENTS

| | | |
|---|---|---|
| CN | 101228760 A | 7/2008 |
| WO | WO 2011/000171 A1 | 1/2011 |
| WO | WO 2011/106936 A1 | 9/2011 |

OTHER PUBLICATIONS

Ruben Soriano, Fabian Hauske, Neil Gonzalez, "Chromatic Dispersion Estimation in Digital Coherent Receivers", Jun. 2011, IEEE, pp. 1627-1637.*

F. Hauske, Z. Zhang, C. Li, C. Xie, Q. Xiong, "Precise, Robust and Least Complexity CD Estimation", Apr. 2011, IEEE, pp. 1-3.*

Ruben Andres Soriano, et al., "Chromatic Dispersion Estimation in Digital Coherent Receivers", Journal of Lightwave Technology, vol. 29, No. 11, Jun. 1, 2011, p. 1627-1637.

F.N. Hauske, et al., "Frequency Domain Chromatic Dispersion Estimation", IEEE, Optical Society of America, 2010, 3 pages.

F.N. Hauske, et al., "Precise, Robust and Least Complexity CD estimation", Optical Society of America, Mar. 6, 2011, 3 pages.

F.N. Hauske, et al., "Fast and Reliable Frequency-Domain CD Estimation", Optical Society of America, 2010, 2 pages.

International Search Report dated Nov. 22, 2012 in connection with International Patent Application No. PCT/EP2012/051642.

Written Opinion of the International Searching Authority dated Nov. 22, 2012 in connection with International Patent Application No. PCT/EP2012/051642.

Yao-hong Hao, et al., "The analysis of phase estimation in coherent optical OFDM system", Journal of Circuits and Systems, vol. 16, No. 1, Feb. 2011, 7 pages.

* cited by examiner

METHOD FOR ESTIMATING A CHROMATIC DISPERSION OF A RECEIVED OPTICAL SIGNAL

CROSS-REFERENCE TO RELATED APPLICATION

This application is a continuation of International Application No. PCT/EP2012/051642, filed on Feb. 1, 2012, entitled "Method for estimating a chromatic dispersion of a received optical signal", which is hereby incorporated herein by reference.

TECHNICAL FIELD

The present disclosure relates to a method for estimating a chromatic dispersion (CD) of a received optical signal. Aspects of the present disclosure relate to CD estimation for digital equalization in coherent detection receivers.

BACKGROUND

In coherent optical transmission system, chromatic dispersion accumulates during fiber transmission and causes severe inter-symbol-interference (ISI), which brings severe degradation to system. During initialization of the digital coherent receiver, a robust and accurate CD estimation is vital to set the frequency-domain (FD) CD compensation filter. If the CD estimation fails with a large estimation error, none of the subsequent equalization and synchronization stages could work. This would result in a total failure of the transponder.

Currently, CD estimation is performed by non-data-aided, i.e. blind estimation techniques under implementation constraint conditions such as bandwidth limitation and sampling rate. The estimation is performed by scanning over the whole possible CD range and thus takes a lot of time and slows down the initialization speed of the digital coherent receiver as all other processes have to wait until it is finished.

The following two problems have been observed with the existing CD estimation:

Changing the step width towards a finer resolution, i.e. a smaller CD scanning step, does not improve the estimation precision. The estimation performance is limited and a more precise and more robust estimation could not be obtained.

Changing the step width towards a more coarse resolution, i.e. a larger CD scanning step, is desirable for a faster scanning procedure but runs into the risk of missing the area of optimum CD estimates.

The properties of the observations in A) and B) conclude that the precision of the estimation cannot be increased and that the complexity and the estimation time cannot be speeded up.

SUMMARY

It is the object of the present disclosure to provide a concept for a fast and accurate chromatic dispersion estimation technique in an optical system. Furthermore, low-complexity implementation suitable for high-speed processing is desired.

This object is achieved by the features of the independent claims. Further implementation forms are apparent from the dependent claims, the description and the figures.

The present disclosure relates to providing a gradient or indicator in which part of the total scanning range the best matching CD compensation function is located that will speed up the estimation technique by a reduction of the total scanning range. An optimization criterion is provided as such gradient for iteratively adapting a correlation bandwidth, a CD filter range and a resolution of the scanning.

By that optimization criterion, the estimation is significantly improved with respect to accuracy, robustness and speed as will be presented in the following.

In order to describe the present disclosure in detail, the following terms, abbreviations and notations will be used:
CD: Chromatic Dispersion,
FD: Frequency Domain,
ISI: inter-symbol-interference,
M: number of correlation filter scans, number of chromatic dispersion compensation filters
step: step width or step number of iteration algorithm,
$\Delta D$: resolution of the scanning,
$D_{min} \ldots D_{max}$: range of the scanning,
$D_{max}$: maximum CD value of the scanning range,
$D_{min}$: minimum CD value of the scanning range,
$step_{max}$: maximum step-number, step width or iteration number,
c: speed of light,
$M_{FFT}$: size of the FFT,
$\lambda$: carrier wavelength,
$R_x(f)$ received optical signal,
$\tau$: frequency shifts,
B: continuous frequency integration bandwidth
N: discrete frequency integration bandwidth
$C_D(\tau,B)$: correlation function with respect to frequency shifts $\tau$, depending on choice of integration bandwidth B
$f_s$: sampling frequency,
$R_{x,D}(f)$: filtered samples of the received optical signal,
PDM: Polarization Division Multiplexing,
(D) QPSK: (Differential) Quaternary Phase Shift Keying, (Differential) Quadrature Phase Shift Keying,
FFT: Fast Fourier Transform,
IFFT: Inverse Fast Fourier Transform,
DSP: Digital Signal Processing,
ASIC: Application Specific Integrated Circuit,
ADC: Analog/Digital converter,
LO: Local Oscillator,
WDM: Wavelength Division Multiplex,
POLMUX-QPSK: polarization-multiplexed quadrature phase shift keying.

According to a first aspect, the present disclosure relates to a method for estimating a chromatic dispersion of a received optical signal, the method comprising: scanning the received optical signal through a number of chromatic dispersion compensation filters in a chromatic dispersion filter range between a first chromatic dispersion value and a second chromatic dispersion value with a resolution determined by the chromatic dispersion filter range normalized by the number of chromatic dispersion compensation filters to obtain filtered samples of the received optical signal; and determining a correlation function indicating an estimate of the chromatic dispersion by correlating the filtered samples of the received optical signal with respect to frequency shifts over a correlation bandwidth, wherein the correlation bandwidth, the chromatic dispersion filter range and the resolution are iteratively adapted according to an optimization criterion.

The range of the significant part in the correlation function, i.e. estimations around an optimum correlation function can be controlled by the correlation bandwidth. A smaller correlation bandwidth results in a broader maximum range, a larger correlation bandwidth results in a smaller maximum range. This allows to generate a correlation function that incorporates a wide-range gradient information about the possible best matching CD function and thus to employ less scanning steps with larger CD-step for each step.

In a first possible implementation form of the method according to the first aspect, the method further comprises: using a Fourier Transform to perform the scanning of the received optical signal through the chromatic dispersion filters to obtain the filtered samples of the received optical signal; and selecting a fraction of components of the correlation function to define a cost function.

When performing the scanning in frequency domain, the CD compensation can be realized by a filtering with the respective compensation coefficients. This results in a simple implementation. The Fourier transform can be implemented by a Fast Fourier Transform (FFT). The FFT is a standard algorithm. A lot of implementations exist in hardware and software which can be adapted for an application for CD compensation. The FFT is highly computational efficient. The FFT calculation acts as averaging filter, a larger FFT size provides better robustness against distortions.

By selecting a fraction of components of the correlation function to define a cost function, the number of filter scans can be reduced. When the shifting parameter of the correlation function is set equal to the sampling frequency, the first harmonic, i.e. the clock tone, is obtained. The first harmonic takes its maximum for the optimal CD filter which refers to zero residual CD of the filtered signal. For all other values of the shifting parameter unequal to the sampling frequency, the expectation value of the correlation function is minimal for the optimal CD filter. Depending on the choosing of the shifting parameter, this results in a maximum or a minimum expectation value. When setting the shifting parameter of the correlation function equal to the sampling frequency, it is sufficient to determine a single value of the correlation function to find the maximum. This offers reduced computational complexity and can be seen as the criterion of highest stability.

In a second possible implementation form of the method according to the first aspect as such or according to the first implementation form of the first aspect, the resolution of the scanning is proportional to the correlation bandwidth.

This allows to control the resolution of the scanning around the optimum correlation function by the correlation bandwidth. A smaller correlation bandwidth results in a broader maximum range, a larger correlation bandwidth results in a smaller maximum range. A correlation function can be generated that incorporates a wide-range gradient information about the possible best matching CD function and thus to employ less scanning steps with larger CD-step for each step.

Adjusting the correlation bandwidth selects different frequency components of the filtered signal. It is sufficient to calculate the filtering operation of the CD scan only for the selected frequency components. Therefore, the implementation complexity of the CD estimation can be reduced.

To mitigate channel distortions and data pattern effects in the received signal, averaging over correlations from different received signals can be applied. Cost functions based on small correlation bandwidths result in a broader maximum range with a lower peak to average ratio. This requires more averaging to reach a certain reliability of the estimation. Cost functions based on large correlation bandwidths result in a smaller maximum range with a higher peak to average ratio. This requires less averaging to reach a certain reliability of the estimation.

In a third possible implementation form of the method according to the first aspect as such or according to the any of the preceding implementation forms of the first aspect, the resolution of the scanning is increased, the chromatic dispersion filter range is decreased and the correlation bandwidth is increased in each iteration of the determining the correlation function.

This allows to find the optimum CD estimate by applying a gradient search. In each iteration, the accuracy of the CD estimate can be increased. The accuracy can be predetermined by the number of iterations, e.g. by applying a stop criterion with respect to the predetermined number of iterations. Thus, the CD estimation is fast and accurate.

In a fourth possible implementation form of the method according to the first aspect as such or according to the any of the preceding implementation forms of the first aspect, an estimate of the chromatic dispersion is provided after each iteration of the determining the correlation function.

When the chromatic dispersion is provided after each iteration of the determining the correlation function, a computing time can be predetermined by configuration. When there is much time available, the number of iterations can be adjusted to a long time corresponding to a high number of iterations; when there is little time available, the number of iterations can be adjusted to a short time corresponding to a small number of iterations. In the first case, the CD estimate is of high accuracy while in the first case, the CD estimate is obtained very fast.

In a fifth possible implementation form of the method according to the first aspect as such or according to the any of the preceding implementation forms of the first aspect, the optimization criterion comprises selecting the chromatic dispersion filter range, the resolution of the scanning and the correlation bandwidth with respect to the estimate of the chromatic dispersion in a prior iteration of the determining the correlation function.

This allows to control the chromatic dispersion filter scan range, the resolution of the scanning and the correlation bandwidth depending on a result of a prior iteration and thereby realizing a recursive algorithm or a recursive method. Recursive algorithms are superior to iterative algorithms with respect to convergence speed. The optimum CD estimate is found very fast compared to an iterative procedure not using recursions.

In a sixth possible implementation form of the method according to the first aspect as such or according to the any of the preceding implementation forms of the first aspect, the determining the correlation function comprises a first iteration in which the filtered samples of the received optical signal are scanned in a first chromatic dispersion filter range around an expected chromatic dispersion and an optimum cost function of the correlation function is determined according to the first implementation form of the first aspect; and wherein the determining the correlation function comprises a second iteration in which the filtered samples of the received optical signal are scanned in a second chromatic dispersion filter range around the optimum cost function of the correlation function determined in the first iteration, the second chromatic dispersion filter range having a higher resolution than the first chromatic dispersion filter range, and the estimate of the chromatic dispersion is determined according to the first implementation form of the first aspect as an optimum cost function of the correlation function of the second iteration.

By iteratively applying the scanning procedure, in each step the scanning range around the maximum cost function of the previous estimation is confined, the step width of the CD scan is reduced with a finer resolution and the integration bandwidth in the correlation function is increased. A very large integration range results in a very sharp maximum cost function of the CD scan such that the precision and the robustness of the CD estimation can be further improved reaching the theoretical limits defined by noise distortion.

In a seventh possible implementation form of the method according to the sixth implementation form of the first aspect, the determining the correlation function comprises a third iteration in which the filtered samples of the received optical signal are scanned in a third chromatic dispersion filter range around the optimum cost function of the correlation function determined in the second iteration, the third chromatic dispersion filter range having a higher resolution than the second chromatic dispersion filter range, and the estimate of the chromatic dispersion is determined according to the first implementation form of the first aspect as an optimum cost function of the correlation function of the third iteration.

When using three iterations, the precision is improved compared to using two iterations. Thus, the scanning range around the maximum cost function of the previous estimation is confined and the integration bandwidth in the correlation function is increased. The precision and the robustness of the CD estimation can be further improved.

It is clear that the total numbers of CD filter scans of this recursive procedure starting with a wide-range scan and iteratively confining the search until a defined maximum precision is reached, is lower than the total number of CD scans for the finest scanning resolution to achieve the same precision in a single CD scan.

In an eighth possible implementation form of the method according to the first aspect as such or according to the any of the preceding implementation forms of the first aspect, the correlation function follows a (sin x/x) characteristic with respect to the correlation bandwidth and with respect to the chromatic dispersion of the scanning through the chromatic dispersion compensation filters.

When setting the shifting parameter of the correlation function equal to the sampling frequency, it is sufficient to determine a single value of the correlation function to find the maximum because of its (sin x/x) characteristic. This offers reduced computational complexity and can be seen as the criterion of highest stability.

In a ninth possible implementation form of the method according to any of the preceding implementation forms of the first aspect, the method comprises: using the correlation function for timing recovery of the received optical signal; performing the scanning only for frequencies of sampled values of the received optical signal within the correlation bandwidth and calculating the cost function based on an x-polarization or an y-polarization or any combination of the x-polarization and the y-polarization of the received optical signal.

By using the correlation function for timing recovery of the received optical signal, timing calculations are improved as the computational complexity for the timing calculations is reduced due to the smaller number of filter scans.

When performing the scanning only for frequencies of sampled values of the received optical signal within the correlation bandwidth, the computational complexity is reduced and the CD compensation is faster.

When calculating the cost function based on the x-polarization or the y-polarization or any combination of the x-polarization and the y-polarization of the received optical signal, the cost function becomes insensitive to polarization distortions of the received optical signal, and elaborate prior mitigation of polarization distortions can be avoided.

According to a second aspect, the present disclosure relates to a device for estimating a chromatic dispersion of a received optical signal, the device comprising: a scanner configured to scan the received optical signal through a number of chromatic dispersion compensation filters in a chromatic dispersion filter range between a first chromatic dispersion value and a second chromatic dispersion value with a resolution determined by the chromatic dispersion filter range normalized by the number of chromatic dispersion compensation filters to obtain filtered samples of the received optical signal; and a correlator configured to determine a correlation function indicating an estimate of the chromatic dispersion by correlating the filtered samples of the received optical signal with respect to frequency shifts over a correlation bandwidth, wherein the correlator is configured to iteratively adapt the correlation bandwidth, the chromatic dispersion filter range and the resolution according to an optimization criterion.

The range of the significant part in the correlation function, i.e. estimations around an optimum correlation function can be controlled by the correlation bandwidth. A smaller correlation bandwidth results in a broader maximum range, a larger correlation bandwidth results in a smaller maximum range. This allows to generate a correlation function that incorporates a wide-range gradient information about the possible best matching CD function and thus to employ less scanning steps with larger CD-step for each step. The device can be applied in a coherent optical receiver.

To mitigate channel distortions and data pattern effects in the received signal, averaging over correlations from different received signals can be applied. Cost functions based on small correlation bandwidths result in a broader maximum range with a lower peak to average ratio. This requires more averaging to reach a certain reliability of the estimation. Cost functions based on large correlation bandwidths result in a smaller maximum range with a higher peak to average ratio. This requires less averaging to reach a certain reliability of the estimation.

In a first possible implementation form of the device according to the second aspect, the scanner is configured to use a Fourier Transform to perform the scanning of the received optical signal through the chromatic dispersion filters to obtain the filtered samples of the received optical signal; and the correlator is configured to select a fraction of components of the correlation function to define a cost function.

The range of the significant part in the cost function, i.e. estimations around maximum cost function can be controlled by the integration bandwidth inside the correlation function of the cost function. A smaller integration bandwidth results in a broader maximum range, a larger integration bandwidth results in a smaller maximum range. This allows to generate a cost function that incorporates a wide-range gradient information about the possible best matching CD function by increasing the range of the significant part of the cost function to cover the whole scanning range. It further allows to employ less scanning steps with larger CD-step for each step. The positive and the negative gradient confine the area where the best matching CD function could be located.

In a second possible implementation form of the device according to the first implementation form of the second aspect, the correlator is configured to determine the correlation function in a first iteration in which the filtered samples of the received optical signal are scanned in a first chromatic dispersion filter range around an expected chromatic dispersion and an optimum cost function of the correlation function is determined; and to determine the correlation function in a second iteration in which the filtered samples of the received optical signal are scanned in a second chromatic dispersion filter range around the optimum cost function of the correlation function determined in the first iteration, the second chromatic dispersion filter range having a higher resolution than the first chromatic dispersion filter range, and the estimate of the chromatic dispersion is determined as an optimum cost function of the correlation function of the second iteration.

By iteratively applying the scanning procedure, in each step the scanning range around the maximum cost function of the previous estimation is confined, the step width of the CD scan is reduced with a finer resolution and the integration range in the correlation function is increased. A very large integration range results in a very sharp maximum cost function of the CD scan such that the precision and the robustness of the CD estimation can be further improved reaching the theoretical limits defined by noise distortion.

In a third possible implementation form of the device according to the first or to the second implementation form of the second aspect, the correlator is implemented in an application specific integrated circuit (ASIC) comprising a multiple number of parallel hardware units, each of them determining the correlation function with respect to a different one of the filter scans.

Implementing the correlator in an ASIC increases the speed of CD estimation as the CD filter scan and the correlations can be computed in parallel.

In a fourth possible implementation form of the device according to the second implementation form of the second aspect, a first part of the correlator determining the first iteration of the correlation function is implemented in an application specific integrated circuit and a second part of the correlator determining the second iteration of the correlation function is implemented in a digital signal processor (DSP).

Implementing the first part of the correlator in an ASIC allows to increase the speed of CD estimation in the first iteration where a broad pre-defined scanning range is used, as the filter scan and the correlations can be computed in parallel. Furthermore, the first part of the correlator with a smaller integration bandwidth resulting in a wide-range maximum cost function requires a larger number of averages, which is more efficiently implemented in ASIC. Implementing the second part of the correlator in a DSP requires to store the received signal in a memory and requires to load the received signal into the DSP. Preferably less averaging is applied in the second part of the correlator to avoid the time consuming and elaborate download of the received data sequence. However, implementing the second part of the correlator in a DSP allows to flexibly adjust the scanning range according to the results from the first iteration. An optimal adjusting of the scanning range in the DSP further increases the speed of CD estimation.

According to a third aspect, the present disclosure relates to a computer program having a program code for performing one of the methods according to the first aspect as such or according of any of the implementation forms of the first aspect when run on a computer.

The methods described here are applicable in particular for long-haul transmission using 100-Gb/s polarization-multiplexed quadrature phase shift keying (POLMUX-QPSK) modulation, which is widely applied in products for long-haul optical transmission systems. POLMUX-QPSK modulation is often also referred to as CP-QPSK, PDM-QPSK, 2P-QPSK or DP-QPSK. Similarly, the method applies for other digital modulation formats being single polarization modulation, binary phase shift keying (BPSK) or higher-order quadrature amplitude modulation (QAM).

The methods described herein may be implemented as software in a DSP, in a micro-controller or in any other side-processor or as hardware circuit within an ASIC, or in a combination thereof.

The present disclosure can be implemented in digital electronic circuitry, or in computer hardware, firmware, software, or in combinations thereof.

In summary, less scanning steps are required to reach the same precision and the same robustness. The implementation complexity is reduced. The total number of scanning steps is reduced, for example by a factor of 3 to 10. For small integration bandwidths N, only few operations inside the correlation have to be performed, this provides in average a reduction factor of 2 to 3. The initialization procedure is performed faster. The number of total steps until the final result is obtained is reduced. Even a first wide-range scan already delivers a rough estimation, which can be provided to FD CD compensation. The equalizer can already converge with this value. This provides a reduction factor of 100 to 5. Each step with further fine-tuning can update the FD CD compensation.

The CD estimation uses the clock tone magnitude as an indicator for a matching CD filter. It is the very first algorithm for the initialization. The faster the CD estimation is completed, the faster the timing recovery, the 2×2 MIMO filter acquisition and the carrier recovery can be performed, which results in a faster total initialization.

Timing recovery also uses the clock tone for timing frequency and phase estimation. Therefore, many operations can be shared as timing recovery and timing initialization can run in parallel with CD estimation. This is an additional speed improvement.

BRIEF DESCRIPTION OF THE DRAWINGS

Further embodiments of the present disclosure will be described with respect to the following figures, in which.

DETAILED DESCRIPTION

Figure 1:
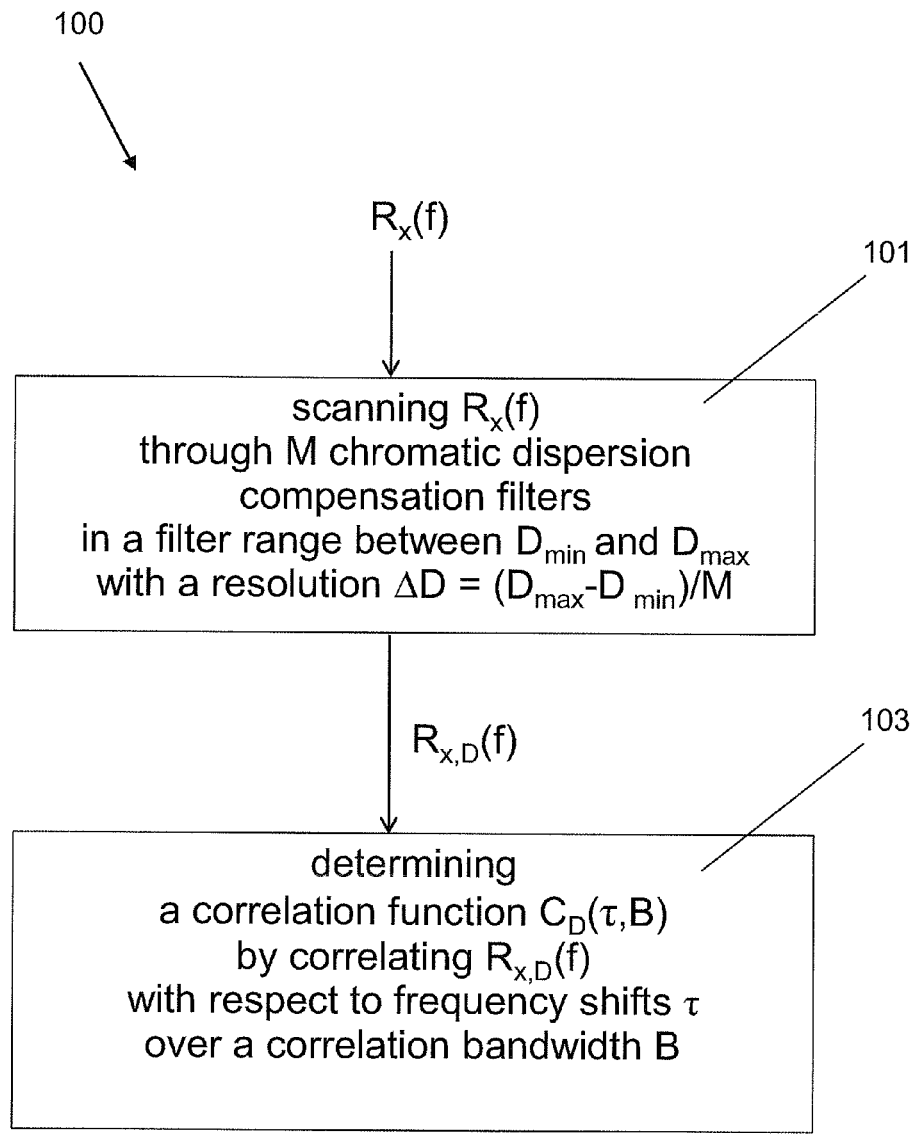
FIG. 1 shows a schematic diagram of a method for estimating a chromatic dispersion of a received optical signal according to an implementation form.

FIG. 1 shows a schematic diagram of a method for estimating a chromatic dispersion of a received optical signal according to an implementation form.

The method 100 comprises: scanning 101 the received optical signal $R_x(f)$ through a number M of chromatic dispersion compensation filters in a chromatic dispersion filter range between a first chromatic dispersion value $D_{min}$ and a second chromatic dispersion value $D_{max}$ with a resolution $\Delta D$ determined by the chromatic dispersion filter range $D_{min} \ldots D_{max}$ normalized by the number M of chromatic dispersion compensation filters to obtain filtered samples $R_{x,D}(f)$ of the received optical signal; and determining 103 a correlation function $C_D(\tau,B)$ indicating an estimate of the chromatic dispersion by correlating the filtered samples $R_{x,D}(f)$ of the received optical signal with respect to frequency shifts $\tau$ over a correlation bandwidth B, wherein the correlation bandwidth B, the chromatic dispersion filter range $D_{min}, \ldots D_{max}$ and the resolution $\Delta D$ are iteratively adapted according to an optimization criterion.

In an implementation form, the determining 103 determines an absolute value of the correlation function $C_D(\tau,B)$.

By choosing the shifting parameter $\tau$ of the correlation function $C_D(\tau,B)$ equal to the sampling frequency $f_s$, the first harmonic, i.e. the clock tone, is obtained. The first harmonic takes its maximum for the optimal CD filter with zero residual CD in the filtered signal. For all other values of $\tau$ unequal to the sampling frequency $f_s$, the expectation value $E\{C_D(\tau,B)\}$ of the correlation function $C_D(\tau,B)$ is minimum for the optimal CD filter. Depending on the choosing of the shifting parameter $\tau$ this results in a maximum or a minimum expectation value $E\{C_D(\tau,B)\}$. When setting the shifting parameter $\tau$ of the correlation function $C_D(\tau,B)$ equal to the sampling frequency $f_s$, it is sufficient to determine a single value of the correlation function to find the maximum. This offers reduced computational complexity and can be seen as the criterion of highest stability.

A cost function according to the representation of FIG. 3, which will be described below with respect to FIG. 3, may be defined by a selected fraction of components of the correlation function $C_D(\tau,B)$ or the expectation value $E\{C_D(\tau,B)\}$ of the correlation function $C_D(\tau,B)$. In an implementation form, the fraction of components of the correlation function is selected equal to multiples of the sampling frequency $f_s$. Then, the cost function includes the clock tones. Depending on the choosing of the shifting parameter $\tau$, the cost function is maximum or minimum.

In an implementation form, the correlation bandwidth B, also called integration bandwidth, is varied in proportion to the resolution $\Delta D$ of the scanning 101. In a first iteration, the whole operating range of the correlation with a very low bandwidth B is covered by the scanning, while in succeeding iterations, the operating range is decreased with accordingly wider bandwidths B by the indexed estimate of the chromatic distortion of the prior iteration. The process is terminated until a defined precision of the estimation is reached or until the maximum available bandwidth B is reached.

In an implementation form, a Fourier Transform, in particular a Fast Fourier Transform (FFT), is used to perform the scanning 101 of the received optical signal $R_x(f)$ through the chromatic dispersion filters to obtain the filtered samples $R_{x,D}(f)$ of the received optical signal. The Fourier Transform may be independently realized from the variation of the correlation bandwidth B. Thus, a size of the FFT does not depend on the iterative bandwidth variation.

In the following, the theoretical background of the method 100 is described in more detail.

Assuming that a transmitted signal $S_x(f)$ for the x-polarization is received after transmission over an optical channel $H_{Ch}(f)$ providing the signal $$R_x(f) = S_x(f) H_{Ch}(f) e^{j2\pi f \tau_s},$$

such that after the filtering by a potential CD compensation function $H_D(f)$ the optical signal $$R_{x,D}(f) = S_x(f) e^{j\psi f^2} e^{j2\pi f^2} e^{j2\pi f \tau_s}$$

is distorted by the residual chromatic dispersion (CD)

$$H_D(f) H_{Ch}(f) = e^{j\psi f^2}$$

with $\psi = -D l \lambda^2 \pi / c$, where c is the speed of light, D is the residual dispersion parameter in [ps/nm], l is the length of fiber, $\lambda$ is the carrier wavelength and $\tau_s$ is the timing phase. The same applies for the other polarization, the y-polarization.

The cost function is based on the correlation function $$C_D(f_s, B) = \int_{-B/2}^{B/2} R_D(f - f_s) R_D^*(f - f_s) \, df$$

$$= \int_{-B/2}^{B/2} S(f - f_s) e^{j\psi(f-f_s)^2} e^{j2\pi(f-f_s)\tau_s} S^*(f + f_s) e^{-j\psi(f+f_s)^2} e^{-j2\pi(f+f_s)\tau_s} \, df$$

$$= e^{-j2\pi 2 f_s \tau_s} \int_{-B/2}^{B/2} S(f - f_s) S^*(f + f_s) e^{-j\psi 4 f f_s} \, df$$

with the integration bandwidth B, and a frequency shift $f_s$, which refers to the Baudrate. The shifting parameter $\tau$ of the correlation function $C_D(\tau,B)$ described above is set here equal to the sampling frequency $f_s$, thereby obtaining the characteristic behavior of the first harmonic, i.e. the clock tone. The polarization index x or y has been omitted for simplicity, but it should be clear that the cost function can be calculated according to the respective polarization.

This correlation function is also used for timing recovery. For zero CD it only contains the timing phase, which is essential to control the sampling of the Analog/Digital converter (ADC).

With some simplifications and approximations it can be shown that the absolute value of the cost function relates to $$|C_D(f_s, B)| = \left| S(f - f_s) S^*(f + f_s) \frac{e^{-j\psi 4 f f_s}}{-j\psi 4 f_s} \bigg|_{-B/2}^{B/2} + \int_{-B/2}^{B/2} (S(f - f_s) S^*(f + f_s))' \frac{e^{-j\psi 4 f f_s}}{-j\psi 4 f_s} \, df \right|$$

$$\approx \left| \frac{B}{2} \frac{\sin(\psi 2 B f_s)}{\psi 2 B f_s} S(B/2 - f_s) S^*(B/2 + f_s) \right|$$

It can be clearly seen that the function scales in a (sin x/x)-characteristic with respect to the integration bandwidth and with respect to the residual CD. The CD scan refers to a linear scan of the parameter D in $H_D(f) = e^{-jD\lambda^2 \pi f^2/c}$. The maximum cost function is obtained for $\psi = 0$ which refers to the best matching filter with zero residual CD in the filtered signal. The best matching CD compensating filter refers to the inverse of the channel satisfying $H_D(f) H_{Ch}(f) = 1$.

To illustrate this characteristic behavior of the cost function, a discrete implementation form is provided here as an example, in which the integration bandwidth B relates to the number of samples M in a discrete correlation function by: $M=B/56*1024$, wherein a size of 1024 is used for the FFT and a sampling of 56 Gigasamples per symbol (GS/s) is applied.

When using a constant default parameter for the bandwidth B, corresponding to a constant number of samples N of the discrete implementation, it can be shown that the range around the maximum is limited to about +/−700 ps/nm for a given N of 128. In an example, different values for the integration range and the corresponding cost function show this limitation. When using an integration range between a lower integration limit $N_{min}=192$ which refers to −B/2 and a second upper integration limit $N_{max}=320$ which refers to B/2, i.e. a number of N=128 integration values, a maximum value for the cost function of $3.6\times10^5$ is obtained within a range of about +/−650 ps/nm around the maximum value. When using an integration range between $N_{min}=182$ and $N_{max}=330$, i.e. a number of N=148 integration values, a maximum value for the cost function of $4.1\times10^5$ is obtained within a range of about +/−550 ps/nm around the maximum value. When using an integration range between $N_{min}=172$ and a second $N_{max}=340$, i.e. a number of N=168 integration values, a maximum value for the cost function of $4.6\times10^5$ is obtained within a range of about +/−450 ps/nm around the maximum value. When using an integration range between a first $N_{min}=112$ and a second $N_{max}=400$, i.e. a number of N=208 integration values, a maximum value for the cost function of $5.6\times10^5$ is obtained within a range of about +/−350 ps/nm around the maximum value.

Thus, by using the discrete implementation form as described above, it clearly shows that the constant default parameter only reaches a certain maximum cost function and only reaches a certain CD indication range. A finer resolution of the CD scan does not bring any significant improvement, i.e. a higher magnitude, with the default configuration. A coarser resolution of the CD scan runs into the risk that the CD indication range is missed and no CD estimation can be obtained.

Hence, the concept of the method 100 becomes clear and can be described as:

"Performing several iteration steps and adjusting the scanning parameters for each round: From wide-range coarse scan to small-range fine scan".

Determining the cost function for the relation of residual CD and bandwidth B clearly indicates that the cost function magnitude can be optimized by choosing an appropriate bandwidth B for each value of CD. A constant bandwidth B relates to a certain width of the range around the maximum area.

It becomes clear that for lower bandwidth B a lower maximum cost function but a wider range is obtained. This results in a wide-range cost function indication but in a low robustness against noise and other distortions. Reversely, a wider bandwidth B yields a higher maximum cost function with a smaller range. This leads to a more precise and robust estimation but requires a small step width and more computational complexity in the correlation function.

Figure 2:
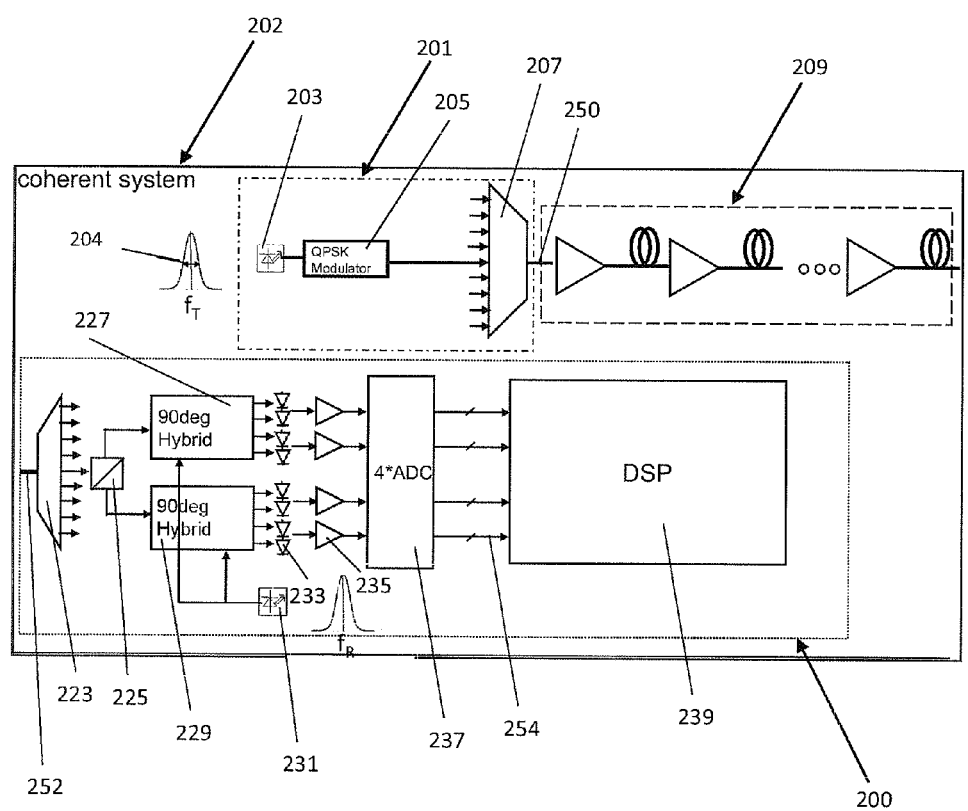
FIG. 2 shows a block diagram of a coherent optical transmission system comprising a coherent receiver estimating a chromatic dispersion of a received optical signal according to an implementation form.

FIG. 2 shows a block diagram of a coherent optical transmission system 202 comprising a coherent receiver 200 estimating a chromatic dispersion of a received optical signal 252 according to an implementation form.

The coherent optical transmission system 202 comprises an optical sender 201 for providing an optical signal 250, an optical channel 209 for transmitting the optical signal 250 and a coherent receiver 200 for receiving a received optical signal 252 which corresponds to the optical signal 250 transmitted over the optical channel 209 and influenced by the optical channel 209.

The optical sender 201 comprises a laser diode 203 for providing an optical carrier signal with a center frequency $f_T$ and a given laser line-width 204. The optical sender 201 further comprises a QPSK modulator 205 for modulating the optical carrier signal with a user data signal to provide a modulated optical data signal. The optical sender 201 further comprises a multiplexer for multiplexing the modulated optical data signal with other modulated optical data signals to provide a multiplexed optical data signal. The multiplexed optical signal may be multiplexed according to a Wavelength Division Multiplex (WDM) transmission system. The multiplexed optical signal corresponds to the optical signal 250 to be transmitted.

The optical channel 209 comprises a plurality of amplifier stages and optical fibers for transmitting the optical signal 250. An output of the optical channel 209 is coupled to an input of the coherent receiver 200, such that the coherent receiver 200 receives the received optical signal 252 which corresponds to the optical signal 250 transmitted over the optical channel 209 at its input.

The coherent receiver 200 comprises a de-multiplexer 223, a polarization beam splitter (PBS) 225, two 6-port 90 degree optical hybrids 227, 229, two sets of balanced detectors 233, two sets of trans-impedance amplifiers (TIA) 235, four analog-digital converters (ADC) 237 and a digital signal processing device 239, for example a digital signal processor (DSP) or a micro-processor or any other processor which is able to perform digital signal processing.

The de-multiplexer 223 is coupled to the input port of the coherent receiver 200 and receives the received optical signal 252 at its input. The de-multiplexer 223 demultiplexes the received optical signal 252 into a plurality of demultiplexed optical signals following a plurality of receiving paths in the coherent receiver 200. FIG. 2 depicts only one of the plurality of receiving paths. In the following one of these receiving paths is illustrated. The demultiplexed optical signal following one receiving path is provided to the polarization beam splitter 225 which splits the signal into its x-polarized and its y-polarized signal components. The x-polarized signal component is provided to a first input, which is a signal input, of the first 6-port 90-degree optical hybrid 227 and the y-polarized signal component is provided to a first input, which is a signal input, of the second 6-port 90-degree optical hybrids 229. A second input, which is a LO input, of the first 6-port 90-degree optical hybrid 227 receives a Local Oscillator signal from a laser diode 231 providing the Local Oscillator signal having a center frequency $f_B$. The same Local Oscillator signal is provided to a second input, which is a LO input, of the 6-port 90-degree optical hybrid 229.

The 90° Optical Hybrids 227, 229 comprise two inputs for signal and LO and four outputs mixing signal and LO. The 90° Optical Hybrids 227, 229 deliver both amplitude and phase of signal, amplify the signal linearly and are suitable for both homodyne and heterodyne detection.

The six-port 90° Optical Hybrids 227, 229 comprise linear dividers and combiners interconnected in such a way that four different vectorial additions of a reference signal, provided by the Local Oscillator, and the signal to be detected are obtained. The levels of the four output signals are detected by balanced receivers 233. By applying suitable baseband signal processing algorithms, the amplitude and phase of the unknown signal can be determined. For optical coherent detection, each of the six-port 90° optical hybrids 227, 229 mixes the incoming signal with the four quadrature states associated with the reference signal in the complex-field space. Each of the optical hybrids 227, 229 then delivers the four light signals to two pairs of balanced detectors 233 which detect a respective optical signal and provide a corresponding electrical signal to the succeeding set of trans-impedance amplifiers 235, one trans-impedance amplifier for each pair of balanced detectors 233. The electrical signals amplified by the trans-impedance amplifiers 235 are analog-digitally converted by the set of A/D converters 237 and then provided as digital signals 254 to a digital signal processing device 239. The digital signal processing device may be implemented as software on a DSP or on a micro-controller or as hardware circuit within an ASIC. In addition, to limit the power consumption associated with inter-chip communication, both the ADCs 237 and digital signal processing device 239 may be preferably integrated on a single-chip.

The digital signal processing device 239 implements the method 100 as described with respect to FIG. 1.

The optical system 202 is based on a coherent detection scheme which detects not only the optical signal's amplitude but phase and polarization as well. With the increased detection capability and spectral efficiency of the optical coherent detection system 202, more data can be transmitted within the same optical bandwidth. Moreover, because coherent detection allows an optical signal's phase and polarization to be detected and therefore measured and processed, transmission impairments which previously presented challenges to accurate data reception, can be mitigated electronically when the received optical signal 252 is converted into the electronic domain.

The optical system 202 provides a method to stabilize frequency difference between the sender 201 and the receiver 200 within close tolerances. A Local Oscillator Frequency Offset is determined as $f_R - f_T$, wherein $f_R$ is the frequency of the received optical signal 252 and $f_T$ is the frequency of the optical signal 250 to be transmitted over the optical channel 209. The optical system 202 further provides the capability to minimize or mitigate frequency chirp or other signal inhibiting noise and the availability of an "optical mixer" to properly combine the signal and the local amplifying light source or local oscillator (LO). For an improved operation of the optical system 202, the DSP part 239 estimates a chromatic dispersion of the received optical signal 252 according to the method as described with respect to FIG. 1 and compensates the received optical signal 252 by the estimated chromatic dispersion. This results in a higher precision of the optical system 202 compared to optical systems which do not use such a coherent optical receiver 200. A coherent optical receiver 200 implementing the method as describe with respect to FIG. 1 offers the following advantages:

An increase of receiver sensitivity compared to receivers not implementing CD estimation according to the method described with respect to FIG. 1 and therefore, permitting longer transmission distances.

Increasing the modulation schemes, i.e. the degree of the modulation scheme, of complex modulation formats such as BPSK, QPSK or 16QAM.

Higher precision in concurrent detection of a light signal's amplitude, phase and polarization allowing more detailed information to be conveyed and extracted, thereby increasing tolerance to network impairments, such as chromatic dispersion, and improving system performance.

Better rejection of interference from adjacent channels in Dense Wavelength Division Multiplex (DWDM) systems, allowing more channels to be packed within the transmission band.

Higher degree of security for secured communications.

Figure 3:
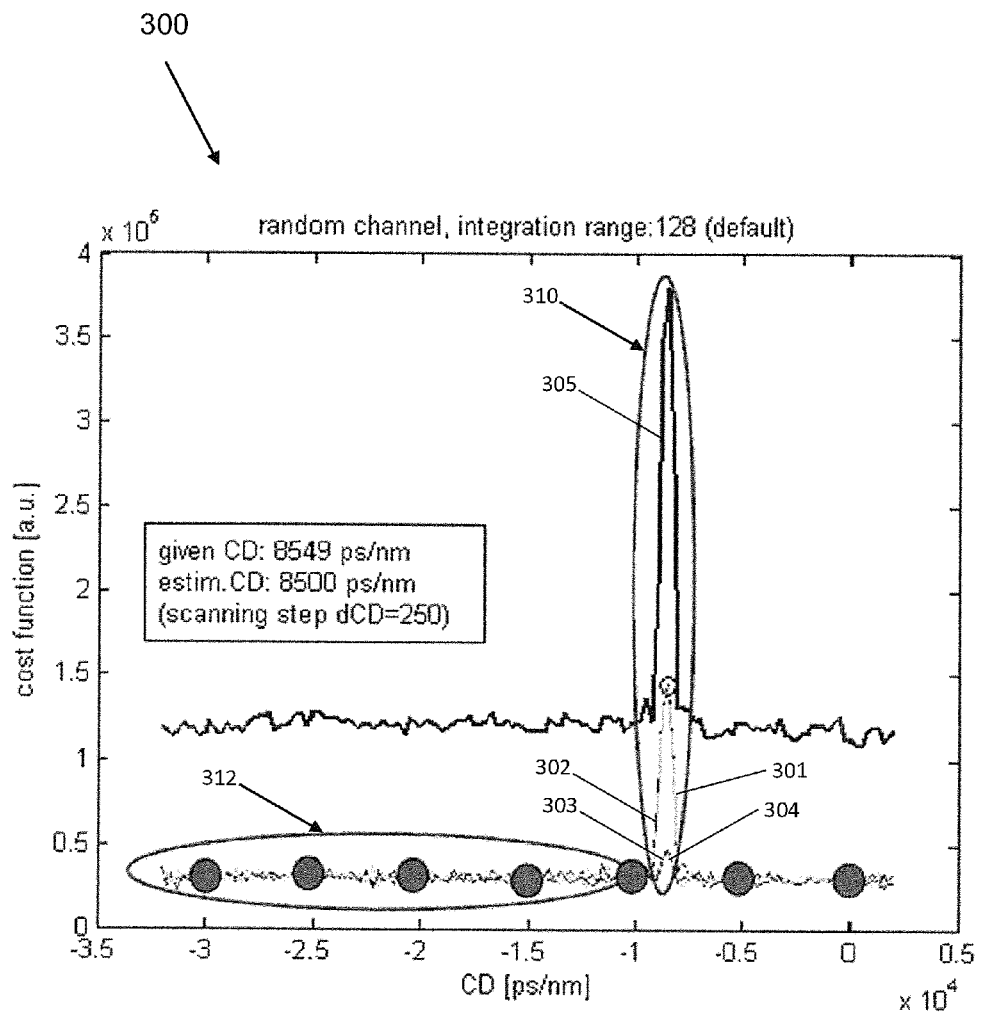
FIG. 3 shows a diagram of a cost function according to an implementation form.

FIG. 3 shows a diagram 300 of a cost function according to an implementation form. The cost function is represented by the absolute value 305 of the auto-correlation function $C_D(\tau, B)$ described above with respect to FIG. 1. As the auto-correlation function is a complex-valued number, the absolute value 305 comprises a product 303 of the real-part and the shifted real-part of the received optical signal, a product 301 of the imaginary-part and the shifted real-part of the received optical signal, a product 302 of the real-part and the shifted imaginary-part of the received optical signal and a product 304 of the imaginary-part and the shifted imaginary-part of the received optical signal. The four products 301, 302, 303 and 304 contributing to the absolute value 305 of the auto-correlation function $C_D(\tau, B)$ are illustrated in FIG. 3. In the illustration of FIG. 3, a chromatic distortion of 8549 ps/nm was given and a chromatic distortion of 8500 ps/nm was estimated wherein a scanning step-size of 250 was applied.

The best matching filtering function 310 is indicated by the maximum cost function. It can be observed that only for CD filter functions closely spaced around the optimum filter function 310, the cost function shows a clear indication, typically three to five CD scan values around the maximum cost function. All other non-matching values 312 reflect noisy components with a nearly constant cost function.

Figure 4:
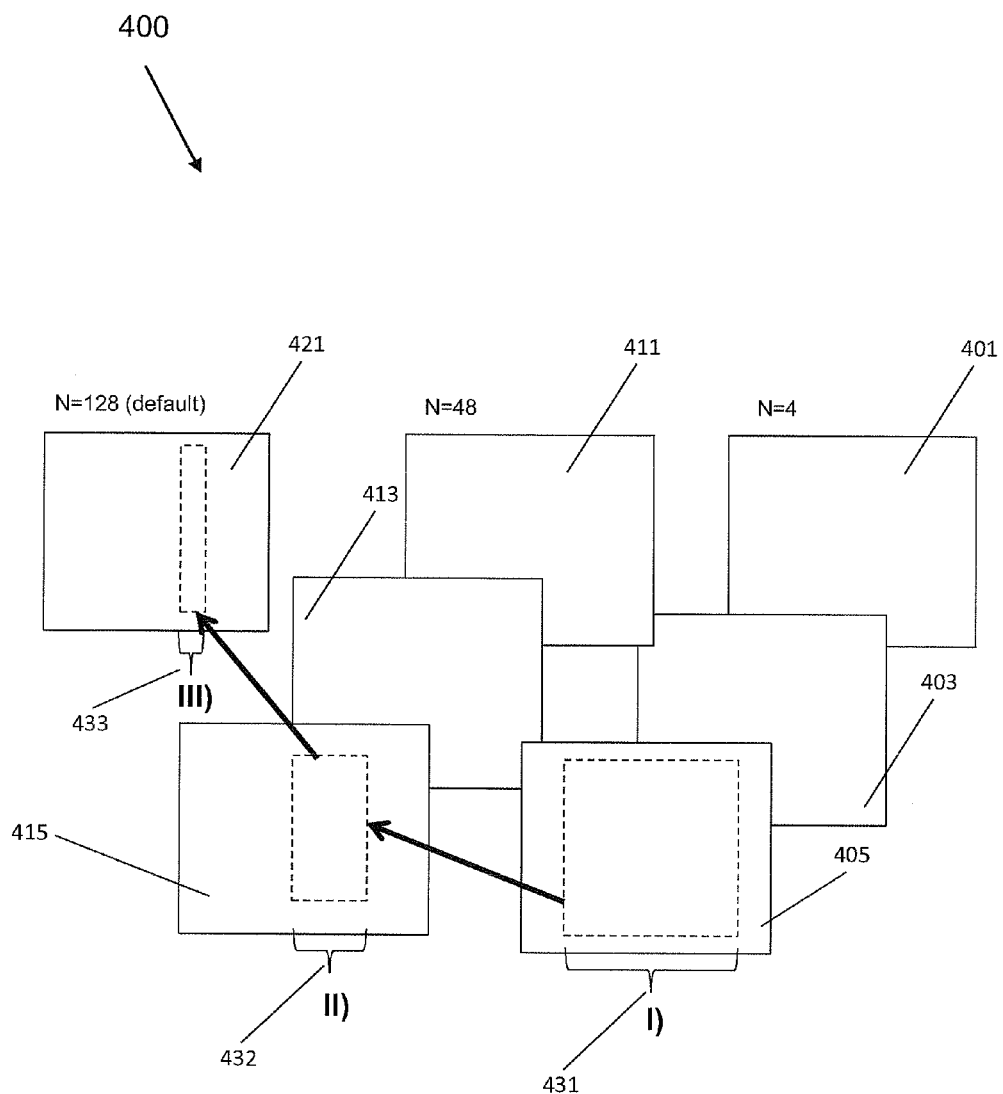
FIG. 4 shows a schematic diagram of a method for estimating a chromatic dispersion of a received optical signal according to an implementation form.

FIG. 4 shows a schematic diagram of a method for estimating a chromatic dispersion of a received optical signal according to an implementation form.

Figure 5:
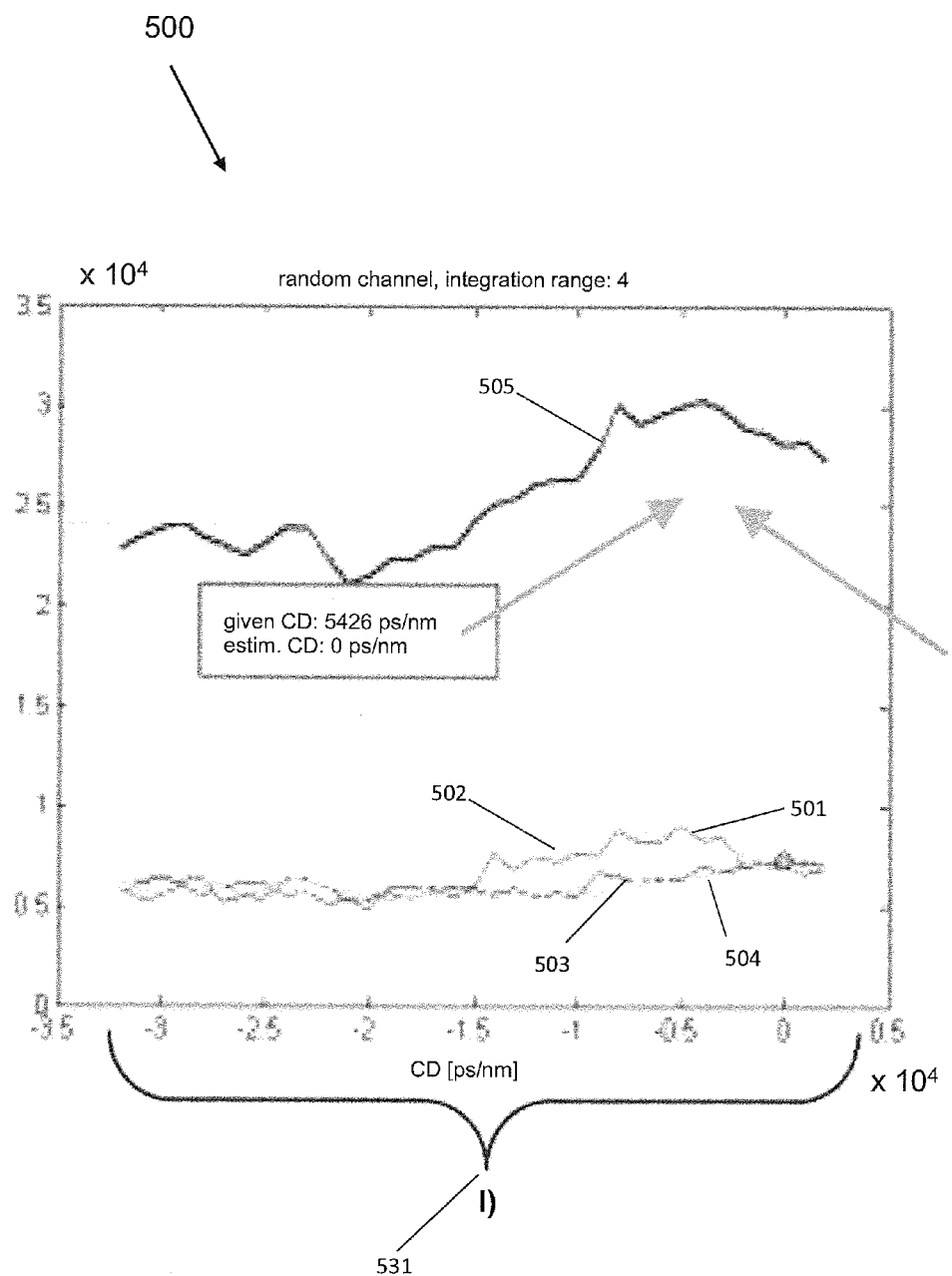
FIG. 5 shows a diagram of a cost function of a first iteration according to an implementation form.

The exemplary scans 401, 403, 405, 411, 413, 415 and 421 with different integration bandwidths N and different filter scan length or length of the scanning or length of CD filter scan or number of chromatic dispersion compensation filters, in FIG. 4 demonstrate that for small N, e.g. N=4 (cf. scan 401, 403 and 405 in the first iteration I), a flat and wide cost function characteristic is achieved suitable for large CD scan steps, i.e. using a wide scanning range 431. An example of such a scan 401, 403, 405 of the first iteration I is shown in FIG. 5 described below.

Figure 6:
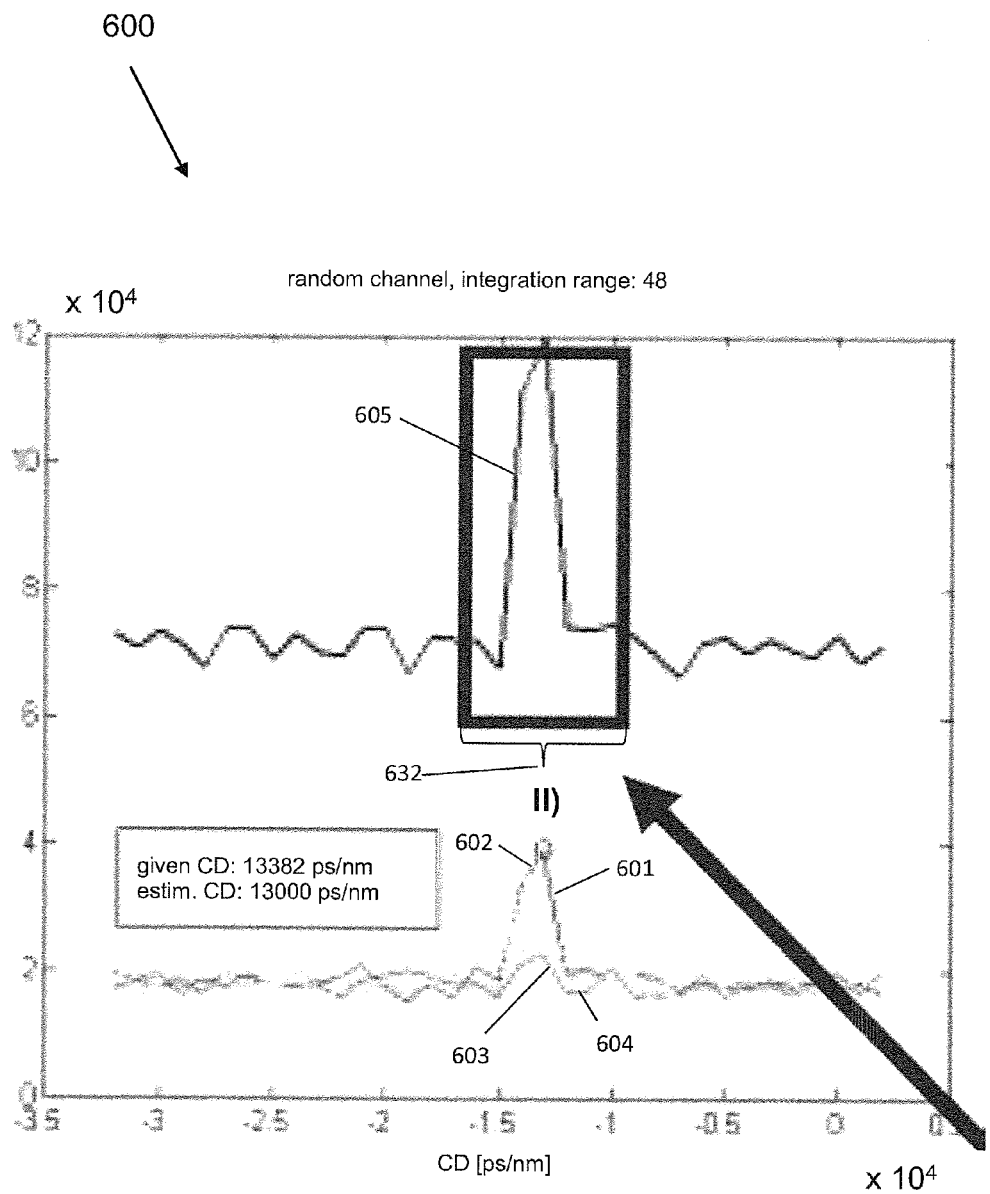
FIG. 6 shows a diagram of a cost function of a second iteration according to an implementation form.

Increasing the integration bandwidth N, e.g. N=48 (cf. scan 411, 413 and 415 in the second iteration II), the range 432 around the maximum cost function decreases but at the same time the maximum value of the cost function increases. Such a second scan 411, 413, 415 according to the second iteration II is performed with a smaller scanning range 432 around the estimation result of the initial scan 401, 403 and 405 according to the first iteration I. An example of such a second scan 411, 413, 415 according to the second iteration II is shown in FIG. 6 described below.

Figure 7:
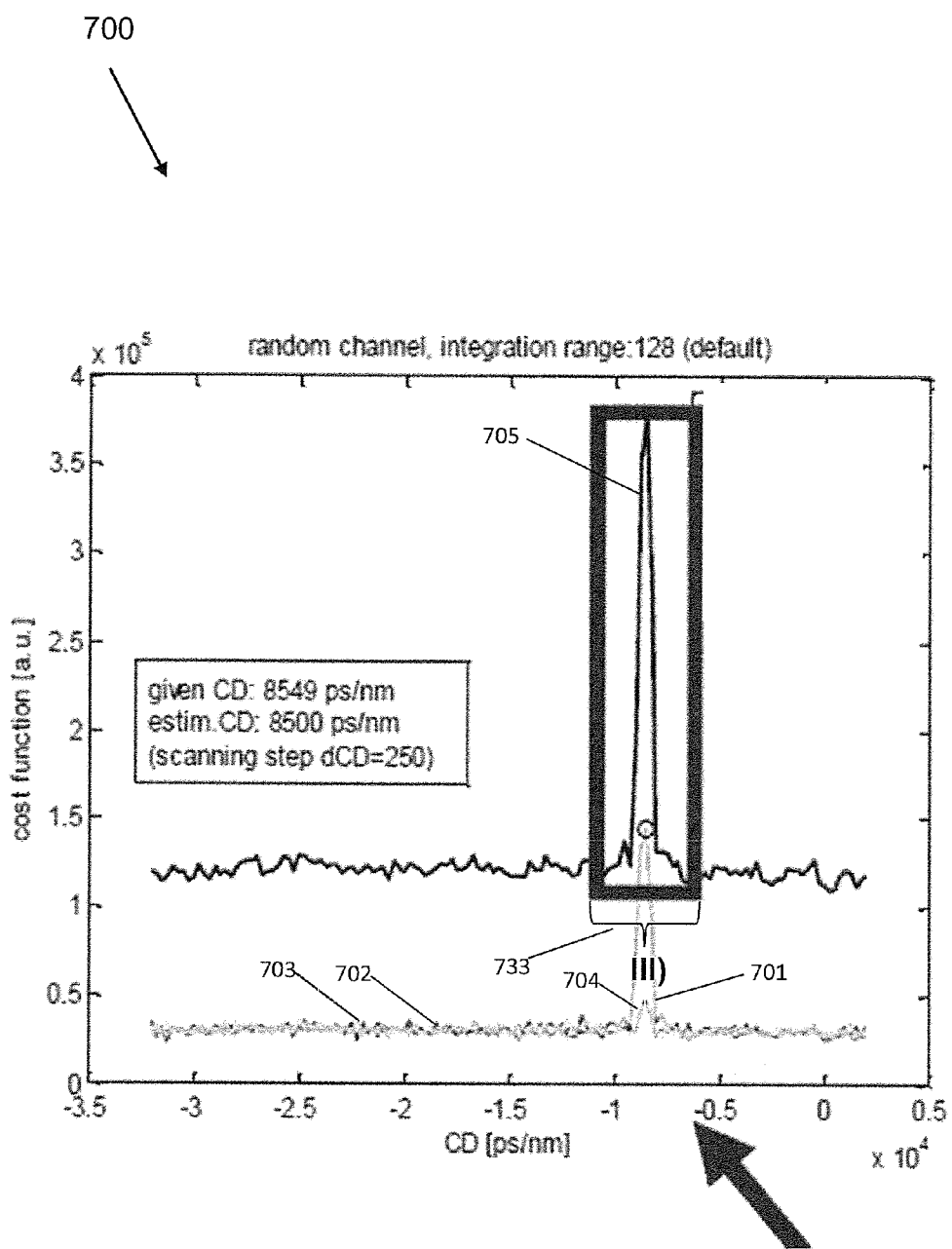
FIG. 7 shows a diagram of a cost function of a third iteration according to an implementation form.

Finally, a third fine scan 421 of high resolution, e.g. an integration range with a number of N=128 discrete values, delivers high precision. An example of such a third scan 421 according to the third iteration III is shown in FIG. 7 described below.

In an implementation form, a multitude of single scans 401, 403 and 405 is performed in the first iteration I to find the optimum of the cost function by averaging. Each of the scans 401, 403 and 405 may be measured with the same first number $N_1$ of discrete correlation operations. The same applies for the second iteration II where a multitude of single scans 411, 413 and 415 is performed, each of them measured with the same number $N_2$ of discrete correlation operations. Even in the third iteration, a multitude of single scans 421 may be performed, each of them measured with the same number $N_3$ of correlation operations, although FIG. 4 represents only one scan 421 for the third iteration III. For the three iterations I, II and III the numbers $N_1$, $N_2$ and $N_3$ of correlation operations are increasing: $N_1<N_2<N_3$. Analogously defined in a time continuous notation, the integrations bandwidth B increases with $B_1<B_2<B_3$.

Due to the small number M of initial CD filter scans 401, 403 and 405, the total complexity of the correlation function for the cost function is tremendously reduced. Furthermore, only frequency components of the received optical signal $R_x(f)$ that fall into the integration bandwidth need to be filtered in the CD filter scan, which additionally reduces the complexity. Less complexity also means fewer operations, which speeds up the estimation. Finally, the low processing requirement of low values of N are suitable for parallel implementation of the filter scan and the correlation in fast ASIC, which brings a speed enhancement of several magnitudes by parallel processing of all potential filters and cost functions.

The following analysis explains why this technology according to a method 100 as described with respect to FIG. 1 achieves the optimum performance. There are three contributors for total estimation deviation which are indicated as follows:

1) Channel distortion and noise: "SNR" of signal naturally translates into standard deviation of the estimation. Some channel conditions, such as polarization effects provide difficult conditions for the clock-tone magnitude as an indicator of the estimation. Ideally, polarization impairments can be mitigated by an appropriate combination of both received signals $R_x(f)$ and $R_y(f)$. Thus, the first contributor is standard deviation of noise $\sigma_n^2$.

2) Finite resolution of scanning step width acts like "quantization" adding a quantization error like in analog-digital converters. The standard deviation of the quantization error refers to $\sigma_q^2=\Delta q^2/12$ for a scanning step width of $\Delta q$. E.g. for $\Delta q=200$ ps/nm a $\sigma_q^2=57$ ps/nm is obtained. Thus, the second contributor is standard deviation of quantization error $\sigma_q^2$.

3) The width of the clock tone. Approximating the central part of the clock tone by a rectangular function of width $B_{sinc}=N_{FFT}*c/(\lambda*R_s)^2/N=40.8e3/N$ ps/nm (at 1024 FFT and 56 GS/s). The broader the clock tone, the weaker is this rectangular approximation. The same equation as for the quantization error can be used and also an equal distribution can be assumed to yield $\sigma_N^2=B_{sinc}^2/12$, e.g. $\sigma_N^2=92$ ps/nm for N=128. Thus, the third contributor is standard deviation of the width N of the clock tone $\sigma_N^2$.

Thus, a total standard deviation of $\sigma_{tot}^2=\sigma_n^2+\sigma_q^2+\sigma_N^2$ is obtained, e.g. $\sigma_{tot}^2=108$ ps/nm for the default parameters as described above with respect to FIG. 1.

The scanning step width and the range of the cost function can be adjusted such that only the deviation of the noise remains.

FIG. 5 shows a diagram 500 of a cost function of a first iteration according to an implementation form. The cost function may correspond to the cost function of one of the scans 401, 403 and 405 according to the first iteration I as described with respect to FIG. 4. The cost function is scanned by using a wide scanning range 531.

The cost function is represented by the absolute value 505 of the auto-correlation function $C_D(\tau,B)$ described above with respect to FIG. 1. As the auto-correlation function is a complex-valued number, the absolute value 505 comprises a product 503 of the real-part and the shifted real-part of the received optical signal, a product 501 of the imaginary-part and the shifted real-part of the received optical signal, a product 502 of the real-part and the shifted imaginary-part of the received optical signal and a product 504 of the imaginary-part and the shifted imaginary-part of the received optical signal. The four products 501, 502, 503 and 504 contributing to the absolute value 505 of the auto-correlation function $C_D(\tau,B)$ are illustrated in FIG. 5. In the illustration of FIG. 5, a chromatic dispersion of 5426 ps/nm was given and a chromatic dispersion of 0 ps/nm was estimated.

FIG. 6 shows a diagram 600 of a cost function of a second iteration according to an implementation form. The cost function may correspond to the cost function of one of the scans 411, 413 and 415 according to the second iteration II as described with respect to FIG. 4. The cost function is scanned by using a decreased scanning range 632 compared to the scanning range 531 of the first iteration I depicted in FIG. 5.

The cost function is represented by the absolute value 605 of the auto-correlation function $C_D(\tau,B)$ described above with respect to FIG. 1. As the auto-correlation function is a complex-valued number, the absolute value 605 comprises a product 603 of the real-part and the shifted real-part of the received optical signal, a product 601 of the imaginary-part and the shifted real-part of the received optical signal, a product 602 of the real-part and the shifted imaginary-part of the received optical signal and a product 604 of the imaginary-part and the shifted imaginary-part of the received optical signal. The four products 601, 602, 603 and 604 contributing to the absolute value 605 of the auto-correlation function $C_D(\tau,B)$ are illustrated in FIG. 6. In the illustration of FIG. 6, a chromatic dispersion of 13382 ps/nm was given and a chromatic dispersion of 13000 ps/nm was estimated.

FIG. 7 shows a diagram 700 of a cost function of a third iteration according to an implementation form. The cost function may correspond to the cost function of the scan 421 according to the third iteration III as described with respect to FIG. 4. The cost function is scanned by using a fine scanning range 733 which is decreased compared to the scanning range 632 of the second iteration II depicted in FIG. 6.

The cost function is represented by the absolute value 705 of the auto-correlation function $C_D(\tau,B)$ described above with respect to FIG. 1. As the auto-correlation function is a complex-valued number, the absolute value 705 comprises a product 703 of the real-part and the shifted real-part of the received optical signal, a product 701 of the imaginary-part and the shifted real-part of the received optical signal, a product 702 of the real-part and the shifted imaginary-part of the received optical signal and a product 704 of the imaginary-part and the shifted imaginary-part of the received optical signal. The four products 701, 702, 703 and 704 contributing to the absolute value 705 of the auto-correlation function $C_D(\tau,B)$ are illustrated in FIG. 7. In the illustration of FIG. 7, a chromatic dispersion of 8549 ps/nm was given and a chromatic dispersion of 8500 ps/nm was estimated at a scanning step-size of 250 ps/nm.

Concerning the given size of the chromatic dispersion illustrated in FIGS. 5 to 7, these are only exemplary scans for different exemplary channel conditions. In an implementation form of the method 100 illustrated in FIG. 4, the (given) chromatic dispersion does not significantly vary over the iteration numbers I, II and III, such that the precision of the estimated chromatic dispersion increases from iteration I to iteration II and further to iteration III.

Figure 8:
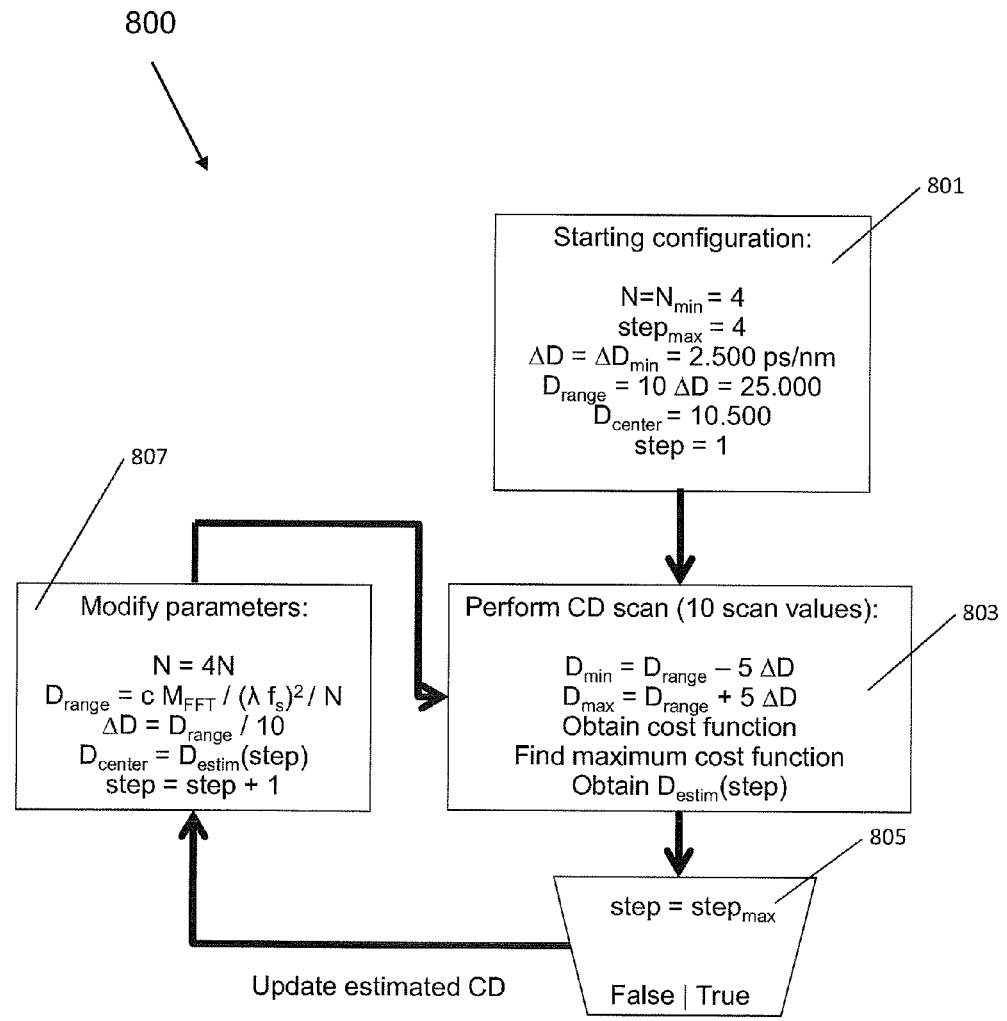
FIG. 8 shows a block diagram of an iterative algorithm for implementing a method for estimating a chromatic dispersion of a received optical signal according to an implementation form.

FIG. 8 shows a block diagram 800 of an iterative algorithm for implementing a method for estimating a chromatic dispersion of a received optical signal according to an implementation form. The algorithm performs an iterative CD estimation consecutively adjusting the integration bandwidth of the cost function and the scanning range $D_{range}$ and resolution $\Delta D$.

A first block 801 represents the starting configuration of the algorithm. The number N of the integration bandwidth is set to an initial value $N_{min}$, for example set to 4. A maximum step-number $step_{max}$ is set to 4. An initial resolution $\Delta D$ of the scanning is set to a minimum resolution value $\Delta D_{min}$, for example set to 2500 ps/nm. A range $D_{range}$ of the scanning is set to an initial range of ten times the resolution $\Delta D$, for example $D_{range}=25000$ ps/nm. A center of chromatic dispersion is set to an initial value, for example set to 10500 ps/nm. A step-number (step) of the scanning is set to an initial step-number, for example set to 1.

A second block 803 representing the scanning processing of the algorithm follows the starting configuration of block 801. The scanning is performed for an exemplary number of ten scan values. A minimum CD value $D_{min}$ of the scanning is set to the range $D_{range}$ minus five times the resolution $\Delta D$. A maximum CD value $D_{max}$ of the scanning is set to the range $D_{range}$ plus five times the resolution $\Delta D$. The cost function is determined, the maximum of the cost function is determined and an estimate $D_{estim}$ with respect to the step-number (step) is obtained.

A third block 805 representing a stop criterion of the algorithm follows the scanning processing of block 803. If the maximum step-number $step_{max}$ is reached, the algorithm is finished. If the maximum step-number $step_{max}$ is not reached, the algorithm processes a next block, the fourth block 807 representing modifying of parameters.

In the fourth block 807, the following operations are performed by the algorithm:
The number N of correlation operations is multiplied by four, i.e. the integration bandwidth is increased by a factor of four, the range $D_{range}$ of the scanning is set to $c\, M_{FFT}/(\lambda\, f_s)^2/N$; c represents the speed of light, $M_{FFT}$ represents the size of the FFT and $\lambda$ represents the carrier wavelength. The resolution $\Delta D$ is set to the scanning range $D_{range}$ divided by ten. The center of chromatic dispersion $D_{center}$ is set to the CD estimate with respect to the step-number: $D_{center}=D_{estim}(step)$. The step-number (step) is increased by one: step=step+1.

After the modifying of parameters represented by the fourth block 807, the algorithms proceeds with the scanning processing represented by the second block 803 as described above. The loop is repeated until the stop criterion in the third block 805 is reached.

Figure 9:
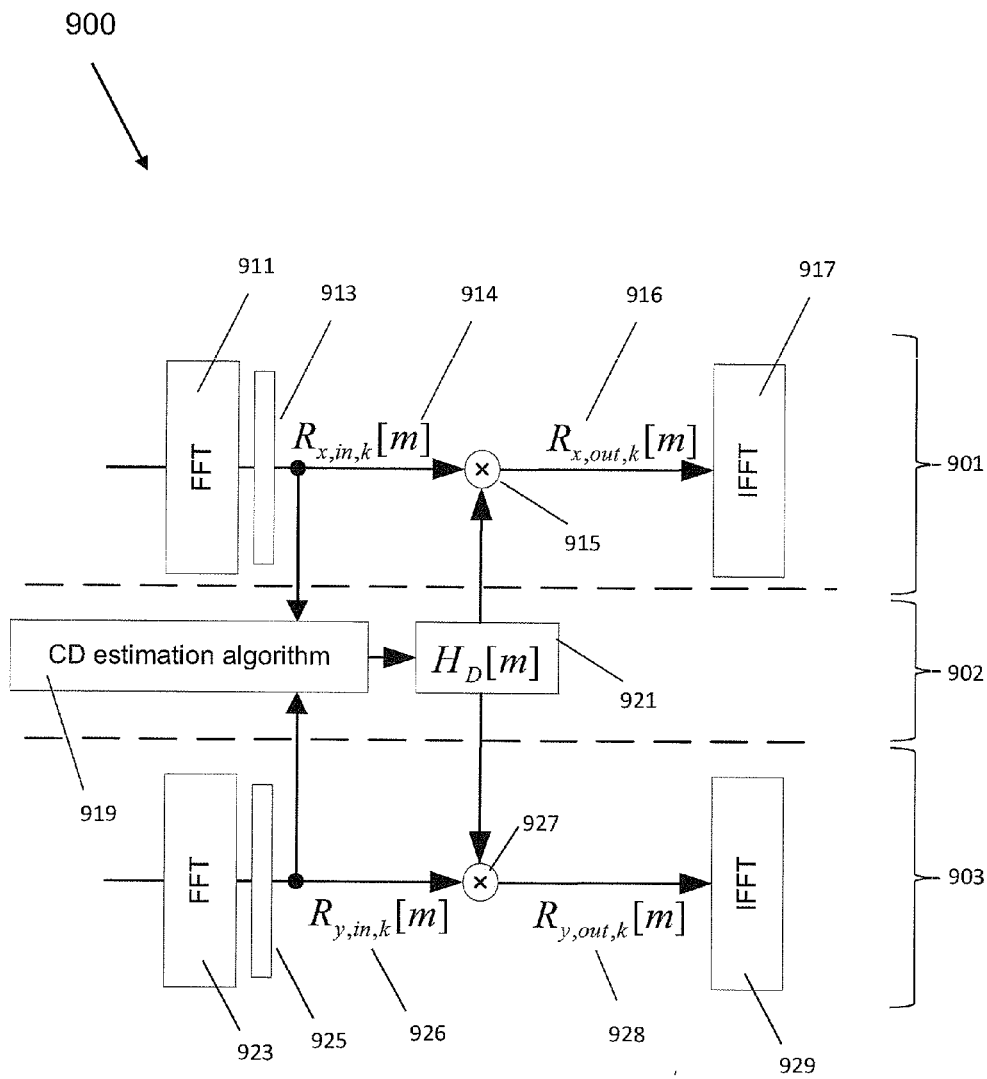
FIG. 9 shows a block diagram of a DSP part in a coherent receiver implementing a method for estimating a chromatic dispersion of a received optical signal according to an implementation form.

FIG. 9 shows a block diagram of a DSP part 900 in a coherent receiver implementing a method for estimating a chromatic dispersion of a received optical signal according to an implementation form. The DSP part may correspond to the digital signal processing device (DSP) 239 of the coherent receiver 200 as described with respect to FIG. 2. The DSP part 900 comprises an upper data path 901 associated to the x-polarization of the received optical signal $R_x(f)$, a lower data path 903 associated to the y-polarization of the received optical signal $R_y(f)$ and a control path 902. The control path 902 may be implemented in a side processor. The CD estimation algorithm 919 and the determination of CD compensation parameters 921 are implemented in the control path 902. The filtering with respect to the x-polarization of the received optical signal, comprising FFT processing 911, mapping 913, multiplication 915 with the compensation parameters 921 and IFFT processing 917 is implemented in the upper data path 901. The filtering with respect to the y-polarization of the received optical signal, comprising FFT processing 923, mapping 925, multiplication 927 with the compensation parameters 921 and IFFT processing 929 is implemented in the lower data path 903.

Figure 10:
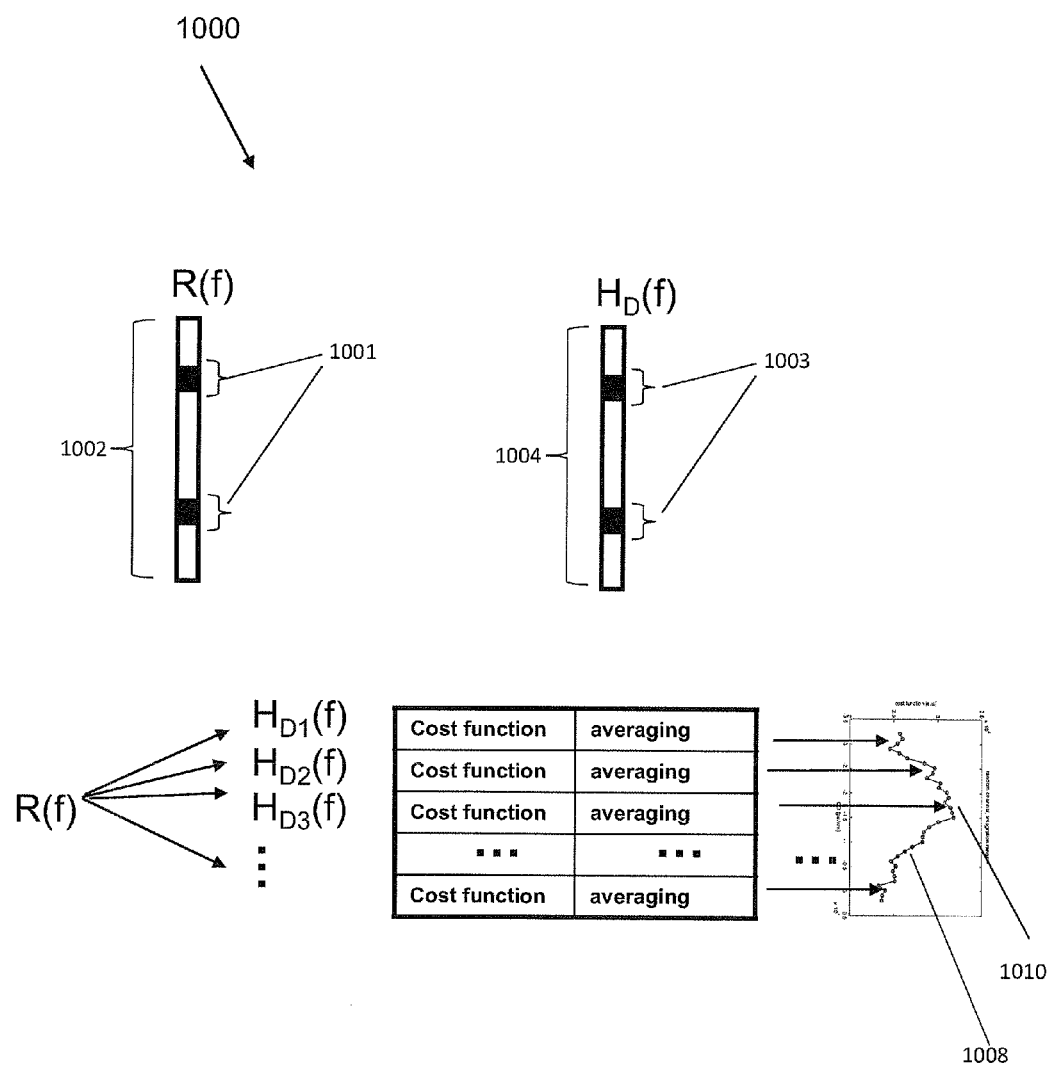
FIG. 10 shows a block diagram of an ASIC part in a coherent receiver implementing a method for estimating a chromatic dispersion of a received optical signal according to an implementation form.

FIG. 10 shows a block diagram of an ASIC part 1000 in a coherent receiver implementing a method for estimating a chromatic dispersion of a received optical signal according to an implementation form. The ASIC part 1000 may be implemented alone or together with the DSP part 900 described with respect to FIG. 9 in the digital signal processing device 239 of the coherent receiver 200 as described with respect to FIG. 2.

A frequency domain (FD) block 1002 of the received optical signal R(f), e.g. having an exemplary number of 1024 samples, comprises relevant FD components 1001 for a first iteration of the CD estimation, e.g. an exemplary number of 16 samples, referring to the integration bandwidth. The CD scanning is only performed with these 16 samples and a reduced set of compensation parameters $H_D(f)$ 1003 with respect to the full set of compensation parameters $H_D(f)$ 1004 are calculated based on the reduced set of FD components 1001. The CD filtering complexity is thereby reduced by a factor of 1024/16. The processing of the individual compensation parameters $H_{Di}(f)$ with 1 ... 10 is performed in separate ASIC blocks which are processing the individual cost functions and the averaging in parallel thereby increasing the speed of the processing. Finally a cost function 1008 with an optimum value 1010 is provided. The optimum value 1010 of the first iteration is provided to the second iteration.

In an implementation form, the CD estimation is implemented in ASIC. In an implementation form, the CD estimation is implemented in a DSP as a side processor or in a microprocessor. In an implementation form, the CD estimation is implemented in a combination of ASIC and DSP.

If applied in ASIC only, the CD scanning steps can be parallelized. In particular, the CD scan of the first iteration applies a low integration bandwidth, i.e. few operations, and the CD scanning range is pre-defined which makes it suitable for ASIC implementation. Using the parallelized implementation in ASIC, the CD estimation can be performed in less than a second.

If implemented in DSP, data-blocks are downloaded from ASIC to the side processor. As the DSP usually does not perform parallel processing, the CD scan is applied sequentially, which takes more time. Still, with the presented method at least a 10-fold speed increase is reached compared to the state of the art. Furthermore, the DSP or microcontroller is programmable and the program code can be accessed with relatively low effort, which unravels the used algorithm.

If implemented in a mixed ASIC/DSP implementation, the following applies: Due to the low processing complexity of the first iteration because of low integration bandwidth and wide-range CD cost function, it is highly suitable to be implemented in ASIC with parallelized CD scan according to the ASIC only implementation. The result of the first iteration is provided to the subsequent iterations, which require more complexity due to an increased integration bandwidth because of less wide CD cost function but higher precision. Less averaging is required for the subsequent iterations, such that they can be implemented in DSP. In addition to the "readable" DSP code and the fast initialization time, the parameters provided from the ASIC in the first iteration to the DSP in the following iterations is an indicator for the use of such an iterative approach.

Figure 11:
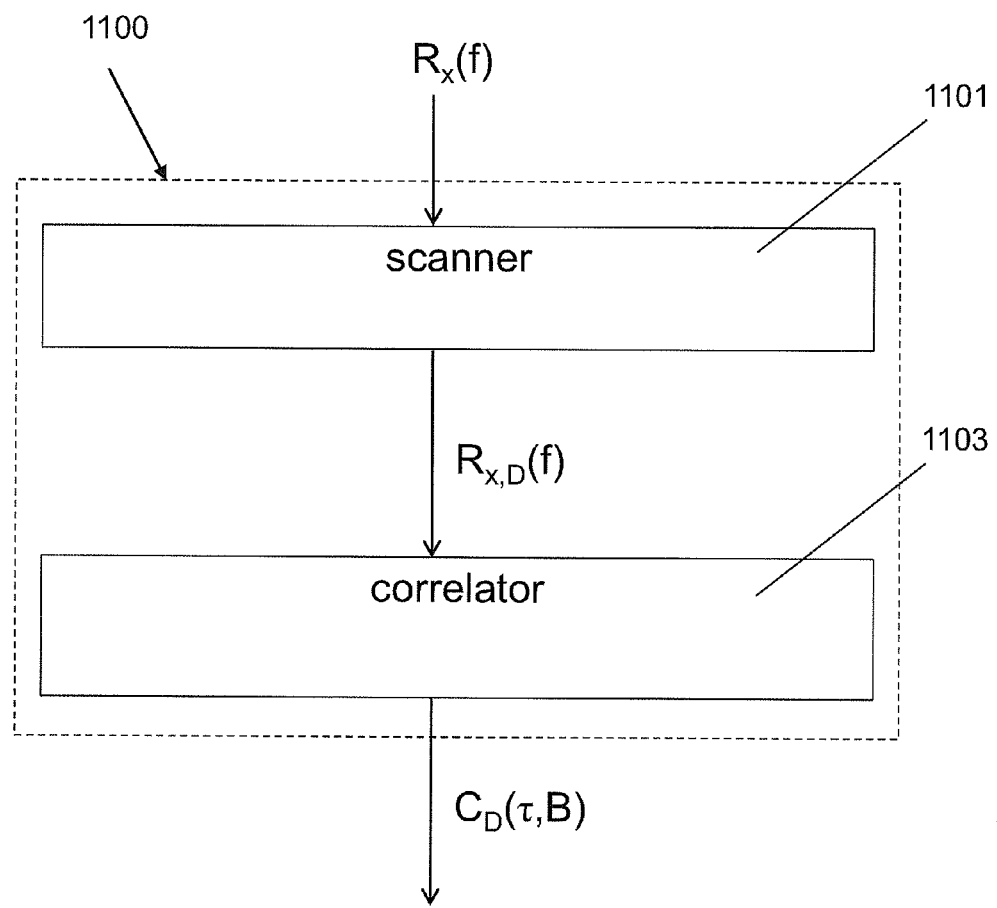
FIG. 11 shows a schematic diagram of a device for estimating a chromatic dispersion of a received optical signal according to an implementation form.

FIG. 11 shows a block diagram of a device 1100 for estimating a chromatic dispersion of a received optical signal according to an implementation form. The device 1100 comprises a scanner 1101 and a correlator 1103. The scanner 1101 is configured to scan the received optical signal $R_x(f)$ through a number M of chromatic dispersion compensation filters in a chromatic dispersion filter range $D_{min} \ldots D_{max}$ between a first chromatic dispersion value $D_{min}$ and a second chromatic dispersion value $D_{max}$ with a resolution $\Delta D$ determined by the chromatic dispersion filter range $D_{min} \ldots D_{max}$ normalized by the number M of chromatic dispersion compensation filters to obtain filtered samples $R_{x,D}(f)$ of the received optical signal $R_x(f)$. The correlator 1103 is configured to determine a correlation function $C_D(\tau,B)$ indicating an estimate of the chromatic dispersion by correlating the filtered samples $R_{x,D}(f)$ of the received optical signal $R_x(f)$ with respect to frequency shifts $\tau$ over a correlation bandwidth B. The correlator 1103 is further configured to iteratively adapt the correlation bandwidth B, the chromatic dispersion filter range $D_{min} \ldots D_{max}$ and the resolution $\Delta D$ according to an optimization criterion. In an implementation form, the device 1100 implements the method 100 as described with respect to FIG. 1. The device 1100 may be implemented in DSP or in ASIC or in a combination thereof, as described above with respect to FIGS. 9 and 10.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

The present disclosure also supports a system configured to execute the performing and computing steps described herein.

Many alternatives, modifications, and variations will be apparent to those skilled in the art in light of the above teachings. Of course, those skilled in the art readily recognize that there are numerous applications of the present disclosure beyond those described herein. While the present disclosures has been described with reference to one or more particular embodiments, those skilled in the art recognize that many changes may be made thereto without departing from the spirit and scope of the present disclosure. It is therefore to be understood that within the scope of the appended claims and their equivalents, the disclosures may be practiced otherwise than as specifically described herein.

What is claimed:

1. A method for estimating a chromatic dispersion of a received optical signal, the method comprising:
    scanning the received optical signal ($R_x(f)$) through a number (M) of chromatic dispersion compensation filters in a chromatic dispersion filter range ($D_{min} \ldots D_{max}$) between a first chromatic dispersion value ($D_{min}$) and a second chromatic dispersion value ($D_{max}$) with a resolution ($\Delta D$) determined by the chromatic dispersion filter range ($D_{min} \ldots D_{max}$) normalized by the number (M) of chromatic dispersion compensation filters to obtain filtered samples ($R_{x,D}(f)$) of the received optical signal ($R_x(f)$); and
    determining a correlation function ($C_D(\tau,B)$) indicating an estimate of the chromatic dispersion by correlating the filtered samples ($R_{x,D}(f)$) of the received optical signal with respect to frequency shifts ($\tau$) over a correlation bandwidth (B),
wherein the correlation bandwidth (B), the chromatic dispersion filter range ($D_{min} \ldots D_{max}$) and the resolution ($\Delta D$) are iteratively adapted according to an optimization criterion.

2. The method of claim 1, comprising:
    using a Fourier Transform to perform the scanning of the received optical signal ($R_x(f)$) through the chromatic dispersion filters to obtain the filtered samples ($R_{x,D}(f)$) of the received optical signal; and
    selecting a fraction ($f_s$) of components ($\tau$) of the correlation function ($C_D(\tau,B)$) to define a cost function.

3. The method of claim 1, wherein the resolution ($\Delta D$) of the scanning is proportional to the correlation bandwidth (B).

4. The method of claim 1, wherein the resolution ($\Delta D$) of the scanning is increased, the chromatic dispersion filter range ($D_{min} \ldots D_{max}$) is decreased and the correlation bandwidth (B) is increased in each iteration (I, II, III) of the determining the correlation function ($C_D(\tau,B)$).

5. The method of claim 1, wherein an estimate of the chromatic dispersion is provided after each iteration (I, II, III) of the determining the correlation function ($C_D(\tau,B)$).

6. The method of claim 1, wherein the optimization criterion comprises selecting the chromatic dispersion filter range ($D_{min} \ldots D_{max}$), the resolution ($\Delta D$) of the scanning and the correlation bandwidth (B) with respect to the estimate of the chromatic dispersion in a prior iteration (I, II, III) of the determining the correlation function ($C_D(\tau,B)$).

7. The method of claim 1, wherein the determining the correlation function ($C_D(\tau,B)$) comprises a first iteration (I) in which the filtered samples ($R_{x,D}(f)$) of the received optical signal ($R_x(f)$) are scanned in a first chromatic dispersion filter range around an expected chromatic dispersion and an optimum cost function of the correlation function ($C_D(\tau,B)$) is determined according to claim 2; and
    wherein the determining the correlation function ($C_D(\tau,B)$) comprises a second iteration (II) in which the filtered samples ($R_{x,D}(f)$) of the received optical signal ($R_x(f)$) are scanned in a second chromatic dispersion filter range around the optimum cost function of the correlation function determined in the first iteration (I), the second chromatic dispersion filter range having a higher resolution than the first chromatic dispersion filter range, and the estimate of the chromatic dispersion is determined according to claim 2 as an optimum cost function of the correlation function ($C_D(\tau,B)$) of the second iteration (II).

8. The method of claim 7, wherein the determining the correlation function ($C_D(\tau,B)$) comprises a third iteration (III) in which the filtered samples ($R_{x,D}(f)$) of the received optical signal ($R_x(f)$) are scanned in a third chromatic dispersion filter range around the optimum cost function of the correlation function determined in the second iteration (II), the third chromatic dispersion filter range having a higher resolution than the second chromatic dispersion filter range, and the estimate of the chromatic dispersion is determined according to claim 2 as an optimum cost function of the correlation function ($C_D(\tau,B)$) of the third iteration (III).

9. The method of claim 1, wherein the correlation function ($C_D(\tau,B)$) follows a (sin x/x) characteristic with respect to the correlation bandwidth (B) and with respect to the chromatic dispersion of the scanning through the chromatic dispersion compensation filters.

10. The method of one of claim 2, comprising:
    using the correlation function ($C_D(\tau,B)$) for timing recovery of the received optical signal ($R_x(f)$);
    performing the scanning only for frequencies of sampled values of the received optical signal ($R_x(f)$) within the correlation bandwidth (B); and
    calculating the cost function based on an x-polarization ($R_{xp}(f)$) or an y-polarization ($R_{yp}(f)$) or any combination of the x-polarization ($R_{xp}(f)$) and the y-polarization ($R_{yp}(f)$) of the received optical signal ($R_x(f)$).

11. A device for estimating a chromatic dispersion of a received optical signal ($R_x(f)$), the device comprising:
    a scanner configured to scan the received optical signal ($R_x(f)$) through a number (M) of chromatic dispersion compensation filters in a chromatic dispersion filter range ($D_{min} \ldots D_{max}$) between a first chromatic dispersion value ($D_{min}$) and a second chromatic dispersion value ($D_{max}$) with a resolution ($\Delta D$) determined by the chromatic dispersion filter range ($D_{min} \ldots D_{max}$) normalized by the number (M) of chromatic dispersion compensation filters to obtain filtered samples ($R_{x,D}(f)$) of the received optical signal ($R_x(f)$); and a correlator configured to determine a correlation function ($C_D(\tau,B)$) indicating an estimate of the chromatic dispersion by correlating the filtered samples ($R_{x,D}(f)$) of the received optical signal ($R_x(f)$) with respect to frequency shifts ($\tau$) over a correlation bandwidth (B), wherein the correlator is configured to iteratively adapt the correlation bandwidth (B), the chromatic dispersion filter range ($D_{min} \ldots D_{max}$) and the resolution ($\Delta D$) according to an optimization criterion.

12. The device of claim 11, wherein the scanner is configured to use a Fourier Transform to perform the scanning of the received optical signal ($R_x(f)$) through the chromatic dispersion filters to obtain the filtered samples ($R_{x,D}(f)$) of the received optical signal ($R_x(f)$); and wherein the correlator is configured to select a fraction ($f_s$) of components ($\tau$) of the correlation function ($C_D(\tau,B)$) to define a cost function.

13. The device of claim 12, wherein the correlator is configured to determine the correlation function ($C_D(\tau,B)$) in a first iteration (I) in which the filtered samples ($R_{x,D}(f)$) of the received optical signal ($R_x(f)$) are scanned in a first chromatic dispersion filter range around an expected chromatic dispersion and an optimum cost function of the correlation function ($C_D(\tau,B)$) is determined; and to determine the correlation function ($C_D(\tau,B)$) in a second iteration (II) in which the filtered samples ($R_{x,D}(f)$) of the received optical signal ($R_x(f)$) are scanned in a second chromatic dispersion filter range around the optimum cost function of the correlation function determined in the first iteration (I), the second chromatic dispersion filter range having a higher resolution than the first chromatic dispersion filter range, and the estimate of the chromatic dispersion is determined as an optimum cost function of the correlation function ($C_D(\tau,B)$) of the second iteration (II).

14. The device of claim 12, wherein the correlator is implemented in an application specific integrated circuit comprising a multiple number of parallel hardware units, each of them determining the correlation function ($C_D(\tau,B)$) with respect to a different one of the filter scans.

15. The device of claim 13, wherein a first part of the correlator determining the first iteration (I) of the correlation function ($C_D(\tau,B)$) is implemented in an application specific integrated circuit and wherein a second part of the correlator determining the second iteration (II) of the correlation function ($C_D(\tau,B)$) is implemented in a digital signal processor.

* * * * *